United States Patent
Siw et al.

(10) Patent No.: US 11,441,448 B2
(45) Date of Patent: Sep. 13, 2022

(54) IMPINGEMENT COOLED ROTATING SEAL

(71) Applicant: United Technologies Corporation, Farmington, CT (US)

(72) Inventors: Sin Chien Siw, Simsbury, CT (US); Timothy Castaldo, West Hartford, CT (US); Charles Joseph Banas, Norwich, CT (US); Jorn Axel Glahn, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/789,977

(22) Filed: Feb. 13, 2020

(65) Prior Publication Data
US 2021/0254502 A1 Aug. 19, 2021

(51) Int. Cl.
| | |
|---|---|
| F01D 25/12 | (2006.01) |
| B33Y 10/00 | (2015.01) |
| B29C 64/10 | (2017.01) |
| F01D 11/00 | (2006.01) |
| F16J 15/16 | (2006.01) |

(52) U.S. Cl.
CPC ............. *F01D 25/12* (2013.01); *B29C 64/10* (2017.08); *B33Y 10/00* (2014.12); *F01D 11/001* (2013.01); *F16J 15/162* (2013.01); *F05D 2220/32* (2013.01); *F05D 2230/31* (2013.01); *F05D 2240/55* (2013.01)

(58) Field of Classification Search
CPC ....... F01D 25/12; F01D 11/001; F16J 15/162; F05D 2220/32; F05D 2230/31; F05D 2240/55
See application file for complete search history.

(56) References Cited

U.S. PATENT DOCUMENTS

| | | | |
|---|---|---|---|
| 2,857,182 A | 10/1958 | Bain et al. | |
| 3,578,343 A | 5/1971 | Taschenberg | |

(Continued)

FOREIGN PATENT DOCUMENTS

| | | |
|---|---|---|
| DE | 202010003158 U1 | 6/2010 |
| EP | 3282153 A1 | 2/2018 |

(Continued)

OTHER PUBLICATIONS

European Search Report Application No. EP21156971; dated May 14, 2021; pp. 12.

*Primary Examiner* — David E Sosnowski
*Assistant Examiner* — Theodore C Ribadeneyra
(74) *Attorney, Agent, or Firm* — Cantor Colburn LLP (57) ABSTRACT

A rotating seal rotatable about a rotational axis is provided. The rotating seal includes a body having a first surface disposable to face the rotational axis and a second surface disposable to contact with a stationary element. The body defines a cooling channel including one or more entrance channels respectively extending from the first surface, one or more exit channels and a plenum. The plenum extends circumferentially through the body and has a hot side adjacent to the second surface. The plenum is fluidly interposed between the one or more entrance channels and the one or more exit channels whereby fluid exiting the one or more entrance channels and entering the plenum impinges against the hot side.

14 Claims, 5 Drawing Sheets

(56) References Cited

U.S. PATENT DOCUMENTS

| | | | | |
|---|---|---|---|---|
| 4,928,978 A | * | 5/1990 | Shaffer | F01D 25/183 |
| | | | | 277/401 |
| 4,990,054 A | * | 2/1991 | Janocko | F16J 15/3404 |
| | | | | 415/111 |
| 5,464,227 A | * | 11/1995 | Olson | F16J 15/3404 |
| | | | | 277/400 |
| 7,730,866 B2 | * | 6/2010 | Melchior | F16J 9/063 |
| | | | | 123/193.6 |
| 10,174,629 B1 | | 1/2019 | Valva et al. | |
| 2014/0119887 A1 | | 5/2014 | Lyle et al. | |
| 2016/0273657 A1 | | 9/2016 | Amador et al. | |
| 2017/0198598 A1 | | 7/2017 | Blais et al. | |
| 2017/0292394 A1 | * | 10/2017 | Duffy | F01D 25/16 |
| 2018/0106157 A1 | | 4/2018 | Kocavik et al. | |

FOREIGN PATENT DOCUMENTS

| | | |
|---|---|---|
| EP | 3382240 A1 | 10/2018 |
| EP | 3495617 A1 | 6/2019 |
| EP | 3626936 A2 | 3/2020 |
| EP | 3647634 A1 | 5/2020 |
| EP | 3702586 A1 | 9/2020 |
| WO | 2014081901 A1 | 5/2014 |

* cited by examiner

IMPINGEMENT COOLED ROTATING SEAL

BACKGROUND

Exemplary embodiments of the present disclosure relate generally to gas turbine engines and, in one embodiment, to an impingement cooled rotating seal.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

The turbine or turbine section of the gas turbine engine has multiple rotating components and multiple stationary components and, in some cases, a rotating component contacts with a stationary component. This occurs, for example, with the rotating seal plate and the stationary seal of a turbine section and a significant amount of heat can be generated at the contact surface between the rotating seal and the stationary seal during operational conditions. Previously, this generated heat has been dissipated by the implementation of cooling channels within the rotating seal and the introduction of oil into the cooling channels as a coolant to remove the generated heat. The cooling channels are normally provided as compound angle cooling channels that are positioned as close as possible to hot spots in the rotating seal but the locations of these cooling channels are typically limited by conventional machining processes that are incapable of forming cooling channels in locations where the oil can fully achieve the desired cooling effect. This limits the overall cooling performance of the cooling channels.

Accordingly, a need exists for an impingement cooling approach in a rotating seal that provides improved performance as compared to what is possible with conventional cooling channels.

BRIEF DESCRIPTION

According to an aspect of the disclosure, a rotating seal rotatable about a rotational axis is provided. The rotating seal includes a body having a first surface disposable to face the rotational axis and a second surface disposable to contact with a stationary element. The body defines a cooling channel including one or more entrance channels respectively extending from the first surface, one or more exit channels and a plenum. The plenum extends circumferentially through the body and has a hot side adjacent to the second surface. The plenum is fluidly interposed between the one or more entrance channels and the one or more exit channels whereby fluid exiting the one or more entrance channels and entering the plenum impinges against the hot side.

In accordance with additional or alternative embodiments, the first surface includes an axial surface disposable to face radially inwardly toward the rotational axis and the second surface is disposable to face axially toward the stationary element.

In accordance with additional or alternative embodiments, the one or more entrance channels and the one or more exit channels have circular cross-sections.

In accordance with additional or alternative embodiments, the one or more entrance channels are angled at about ~30-60 degrees from the rotational axis.

In accordance with additional or alternative embodiments, the plenum has a racetrack-shaped cross-section and a larger cross-sectional area than the one or more entrance channels and the one or more exit channels.

In accordance with additional or alternative embodiments, the plenum includes a protrusion surface portion that protrudes toward the one or more entrance channels.

In accordance with additional or alternative embodiments, the one or more entrance channels are oriented along a radial dimension relative to the rotational axis and the one or more exit channels are angled relative to the radial dimension.

In accordance with additional or alternative embodiments, the one or more entrance channels have flared outlets.

According to an aspect of the disclosure, a turbine section of a gas turbine engine having an engine centerline is provided and includes stationary and rotating seals, which are stationary and rotatable relative to the engine centerline, respectively. The rotating seal includes a body having a first surface disposable to face the engine centerline and a second surface disposable to contact with the stationary element. The body defines a cooling channel that includes one or more entrance channels respectively extending from the first surface, one or more exit channels and a plenum. The plenum extends circumferentially through the body and haves a hot side adjacent to the second surface. The plenum is fluidly interposed between the one or more entrance channels and the one or more exit channels whereby fluid exiting the one or more entrance channels and entering the plenum flows along outer surfaces of the one or more entrance channels and impinges against the hot side.

In accordance with additional or alternative embodiments, the stationary and rotating seals face in the forward and aft directions, respectively, or the stationary and rotating seals face in the aft and forward directions, respectively, and the first surface includes an axial surface disposable to face radially inwardly toward the engine centerline and the second surface is disposable to face axially toward the stationary element.

In accordance with additional or alternative embodiments, the one or more entrance channels and the one or more exit channels have circular cross-sections.

In accordance with additional or alternative embodiments, the one or more entrance channels are angled at about ~30-60 degrees from the engine centerline.

In accordance with additional or alternative embodiments, the plenum has a racetrack-shaped cross-section and a larger cross-sectional area than the one or more entrance channels and the one or more exit channels.

In accordance with additional or alternative embodiments, the plenum includes a protrusion surface portion that protrudes toward the one or more entrance channels.

In accordance with additional or alternative embodiments, the one or more entrance channels are oriented along a radial dimension relative to the engine centerline and the one or more exit channels are angled relative to the radial dimension.

In accordance with additional or alternative embodiments, the one or more entrance channels have flared outlets.

According to an aspect of the disclosure, a method of additively manufacturing a rotating seal to be rotatable about a rotational axis is provided. The method includes additively manufacturing a body to have a first surface disposable to face the rotational axis and a second surface disposable to contact with a stationary element and to define a cooling channel. The cooling channel includes one or more entrance channels respectively extending from the first surface, one or more exit channels and a plenum. The plenum extends circumferentially through the body and has a hot side adjacent to the second surface. The plenum is fluidly interposed between the one or more entrance channels and the one or more exit channels whereby fluid exiting the one or more entrance channels and entering the plenum impinges against the hot side.

In accordance with additional or alternative embodiments, the one or more entrance channels and the one or more exit channels have circular cross-sections and the one or more entrance channels are angled at about ~30-60 degrees from the rotational axis. The plenum has a racetrack-shaped cross-section and a larger cross-sectional area than the one or more entrance channels and the one or more exit channels or the plenum includes a protrusion surface portion that protrudes toward the one or more entrance channels.

In accordance with additional or alternative embodiments, the one or more entrance channels are oriented along a radial dimension relative to the rotational axis and the one or more exit channels are angled relative to the radial dimension.

In accordance with additional or alternative embodiments, the one or more entrance channels have flared outlets.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
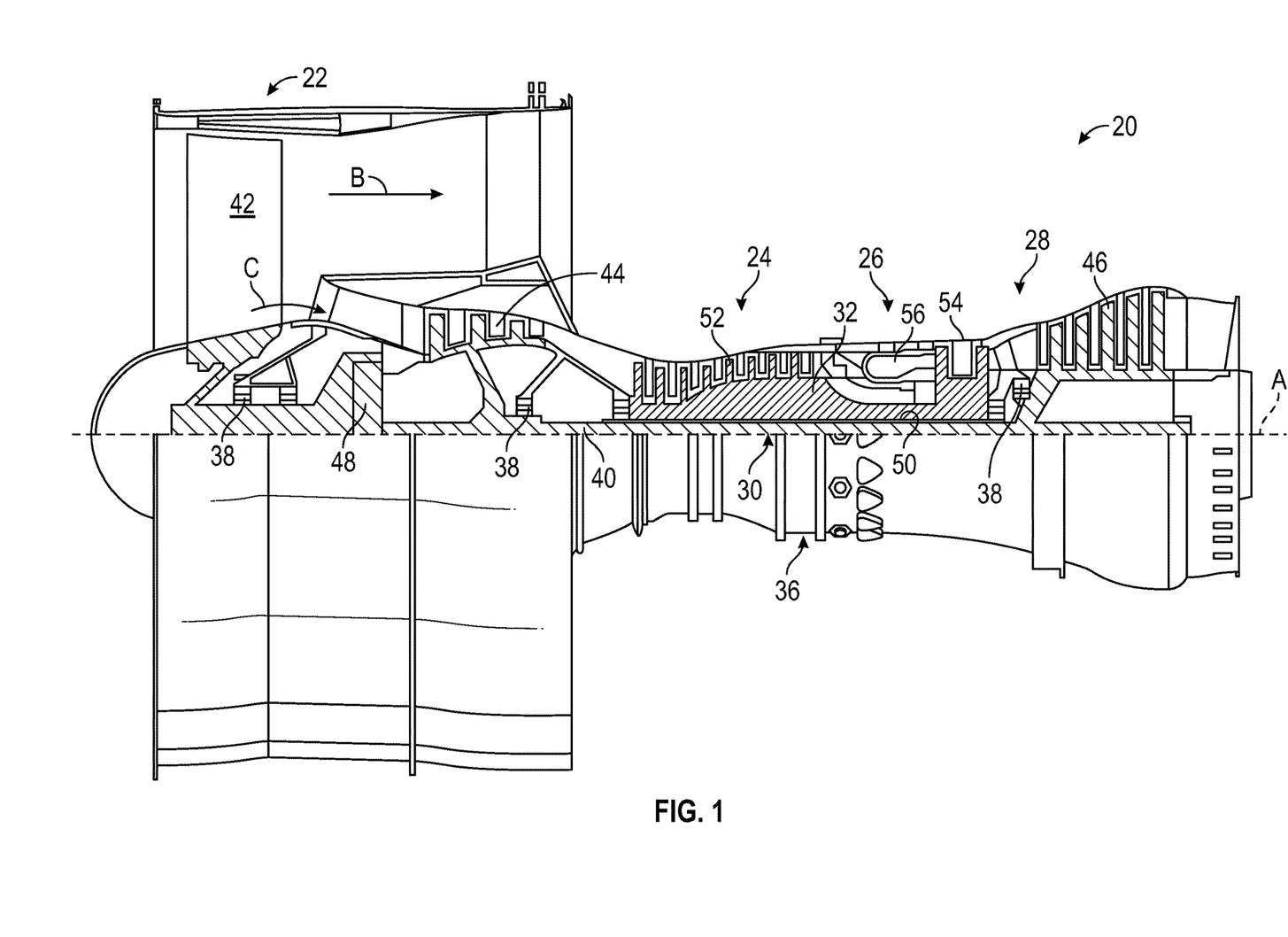
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans and may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

As will be described below, an impingement cooling approach for use in a rotating seal or another suitable component of a gas turbine engine, such as the gas turbine engine 20 of FIG. 1, is provided. The impingement cooling approach is characterized in that oil is fed through an entrance channel to a plenum and from the plenum to an exit channel. The entrance channel can, in some cases, have a circular cross-section and is positioned between 30-60 degrees from the horizontal plane (i.e., the engine central longitudinal axis of the gas turbine engine 20 of FIG. 1). The plenum can be provided as a racetrack-shaped channel and can have a larger cross-sectional area than the entrance and exit channels. The plenum can be arranged to extend circumferentially through the rotating seal of the gas turbine engine 20 and across the stationary seal with which the rotating seal makes contact.

Figure 2:
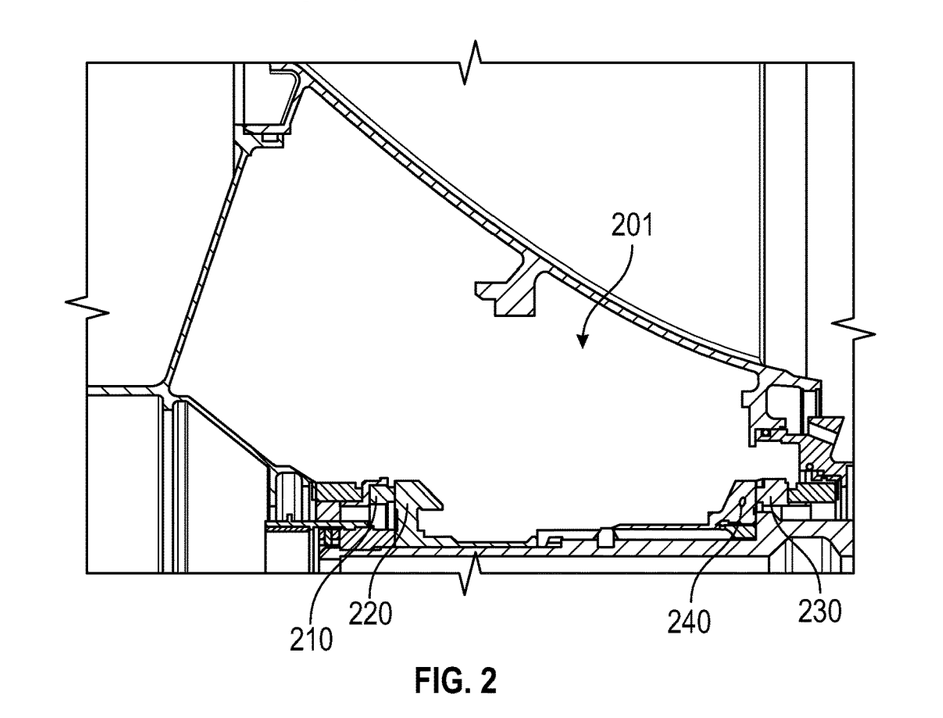
FIG. 2 is a side view of a compartment of the gas turbine engine of FIG. 1.
Figure 3:
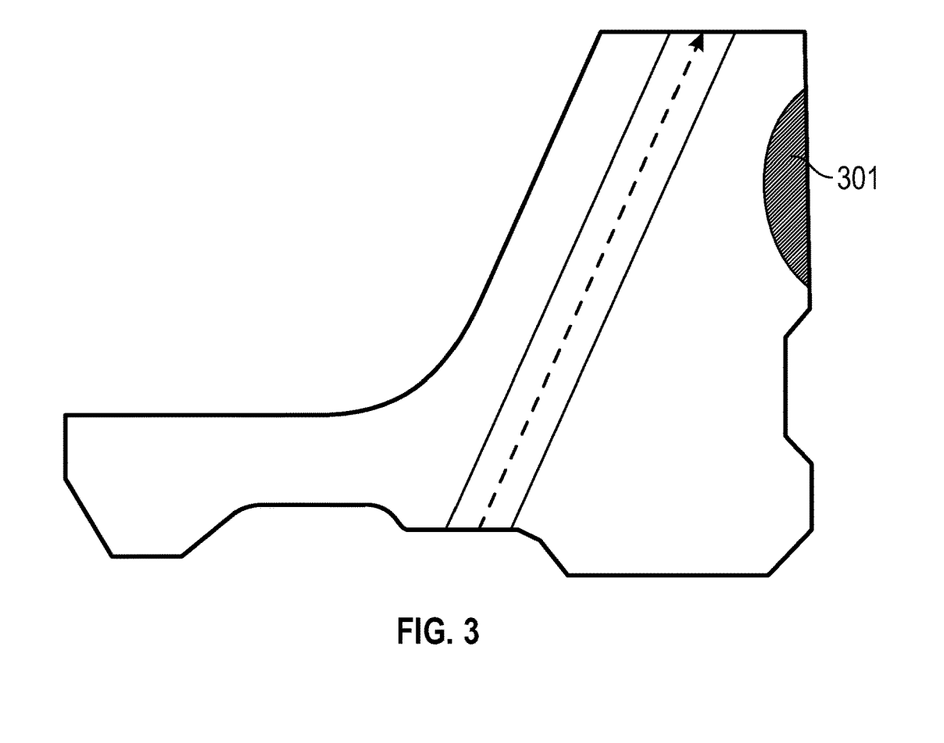
FIG. 3 is an illustration of a hot spot of a rotating seal of the compartment of FIG. 2.

With continued reference to FIG. 1 and with additional reference to FIGS. 2 and 3, a compartment 201 of the gas turbine engine 20 of FIG. 1 includes a forward stationary seal 210 that is stationary relative to a rotational axis, such as the engine centerline A (see FIG. 1), a forward rotating seal 220 that is rotatable about the rotational axis, an aft stationary seal 230 that is stationary relative to the rotational axis and an aft rotating seal 240 that is rotatable about the rotational axis. The forward stationary seal 210 faces in the aft direction and the forward rotating seal 220 faces in the forward direction and contacts with the forward stationary seal 210. The aft stationary seal 230 faces in the forward direction and the aft rotating seal 240 faces in the aft direction and contacts with the aft stationary seal 210.

The following description will generally relate to the configuration of the aft rotating seal 240 and the contact between the aft rotating seal 240 and the aft stationary seal 230. This is done for clarity and brevity and should not be interpreted as limiting the scope of the disclosure in any way. It should be further understood that the features of the following description are applicable to both the aft rotating seal 240 and the contact between the aft rotating seal 240 and the aft stationary seal 230 as well as the forward rotating seal 220 and the contact between the forward rotating seal 220 and the forward stationary seal 210 as well.

As shown in FIG. 3, a conventional version of the aft rotating seal 240 has a cooling channel defined therein from an interior facing surface to an exterior facing surface such that, when the conventional aft rotating seal rotates about the engine centerline, cooling fluid (e.g., oil) is forced by centrifugal force to flow radially outwardly through the cooling channel. However, due to limits in manufacturing processes, the cooling channel does not extend near where the conventional aft rotating seal 240 contacts the aft stationary seal 230. Thus, the portion of the conventional aft rotating seal 240 that makes frictional, heat generating contact with the aft stationary seal 230 during operations of the gas turbine engine 20 does not thermally interact with the cooling fluid in the cooling channel to a substantial degree. Therefore, heat generated by the frictional, heat generating contact is not efficiently removed and a hot-zone 301 can be generated in the portion of the conventional aft rotating seal 240. This hot-zone can lead to damage and wear of the aft rotating seal 240 as well as degraded performance of the gas turbine engine 20.

Figure 4:
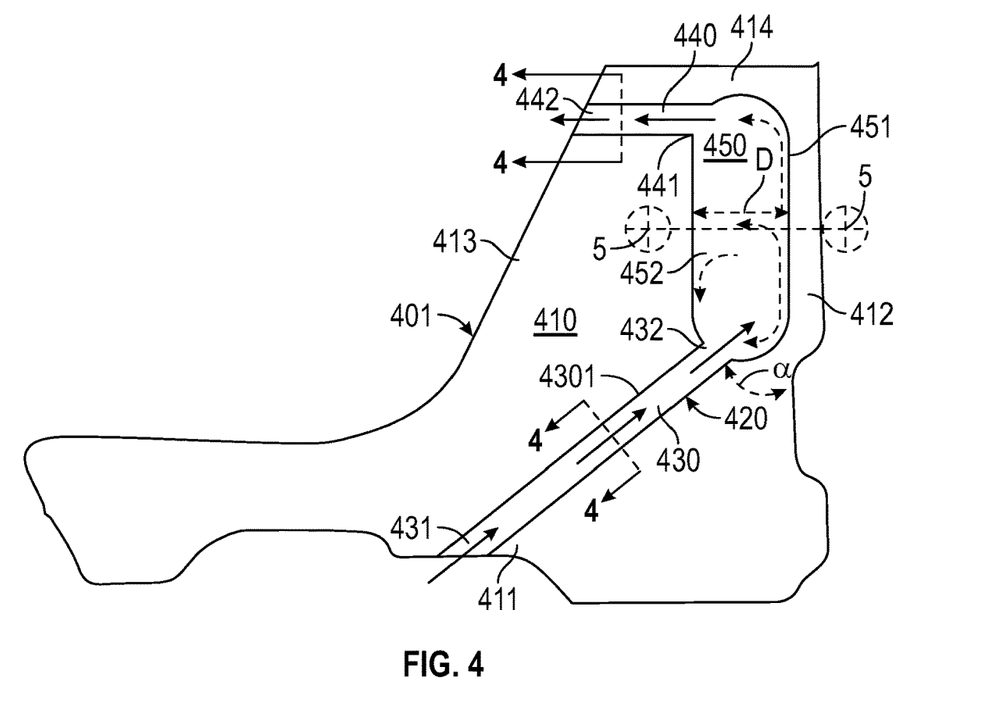
FIG. 4 is schematic side view of a rotating seal with a cooling channel in accordance with embodiments.

With reference to FIG. 4, an aft rotating seal 401 is provided for use in the gas turbine engine 20 of FIG. 1 and the compartment 201 of FIG. 2 and includes a body 410. The body 410 has a first surface 411, a second surface 412 and first and second additional surfaces 413 and 414. The first surface 411 is disposable to face the rotational axis or engine centerline A of FIG. 1 (hereinafter referred to as the "rotational axis"). The second surface 412 is disposable to contact with a stationary element (hereinafter referred to as the "aft stationary seal 230" of FIG. 2). The first and second additional surfaces 413 and 414 are opposite the first surface 411 and the second surface 412, respectively. The body 410 is formed to define a cooling channel 420 that includes one or more entrance channels 430, one or more exit channels 440 and a plenum 450. Each of the one or more entrance channels 430 respectively extends from an inlet 431 coincident with the first surface 411 to an outlet 432 at an entrance to the plenum 450. Each of the one or more exit channels 440 respectively extends from an inlet 441 at an exit of the plenum 450 to an outlet 442 coincident with one of the first and second additional surfaces 413 and 414. The plenum 450 extends circumferentially through the body 410 and has a hot side 451 that is adjacent to the second surface 412 and a relatively cool side 452 that is opposite the hot side 451.

The formation of the body 410 and the cooling channel 410 can be accomplished by additive manufacturing, three-dimensional (3D) printing or other similar proccesses.

The plenum 450 is fluidly interposed between the one or more entrance channels 430 and the one or more exit channels 440. During operations of the gas turbine engine 20 in which the aft rotating seal 401 rotates about the rotational axis, cooling fluid (e.g., oil) is forced by centrifugal force to enter and flow through the one or more entrance channels 430 to the plenum 450, to impinge against at least the hot side 451 of the plenum 450 and to exit and then flow through the one or more exit channels 440. In greater detail, the cooling fluid moving through the one or more entrance channels 430 flows along radial outer surfaces 4301 of the one or more entrance channels 430 and is expelled in a jet-like flow from the outlets 432 to impinge against the hot side 451 of the plenum 450. Once the cooling fluid is inside the plenum 450, the cooling fluid moves in a turbulent manner between the hot side 451 and the relatively cool side 452 before forming a film of cooling fluid and exiting into the one or more exit channels 440. The impingement of the cooling fluid against the hot side 451 and the subsequent turbulent flow causes the cooling fluid to efficiently thermally interact with the hot side 451 and thus to remove the heat generated by the frictional, heat generating contact between the second surface 412 and the aft stationary seal 430.

In accordance with embodiments, the one or more entrance channels 430 and the one or more exit channels 440 can have circular cross-sections when viewed along the perspectives identified by lines 4-4 in FIG. 4, the one or more entrance channels 430 can be angled at about ~30-60 degrees from the rotational axis and are substantially straight along respective entire lengths thereof. In accordance with additional embodiments, the plenum 450 can have a racetrack-shaped cross-section when viewed along the circumferential perspective identified by line 5-5 in FIG. 4. This racetrack-shaped cross-section can have a larger cross-sectional area than that of any of the one or more entrance channels 430 or any of the one or more exit channels 440 and provides for separation distance D between the hot side 451 and the relatively cool side 452, which encourages turbulent flow of the cooling fluid.

Figure 5:
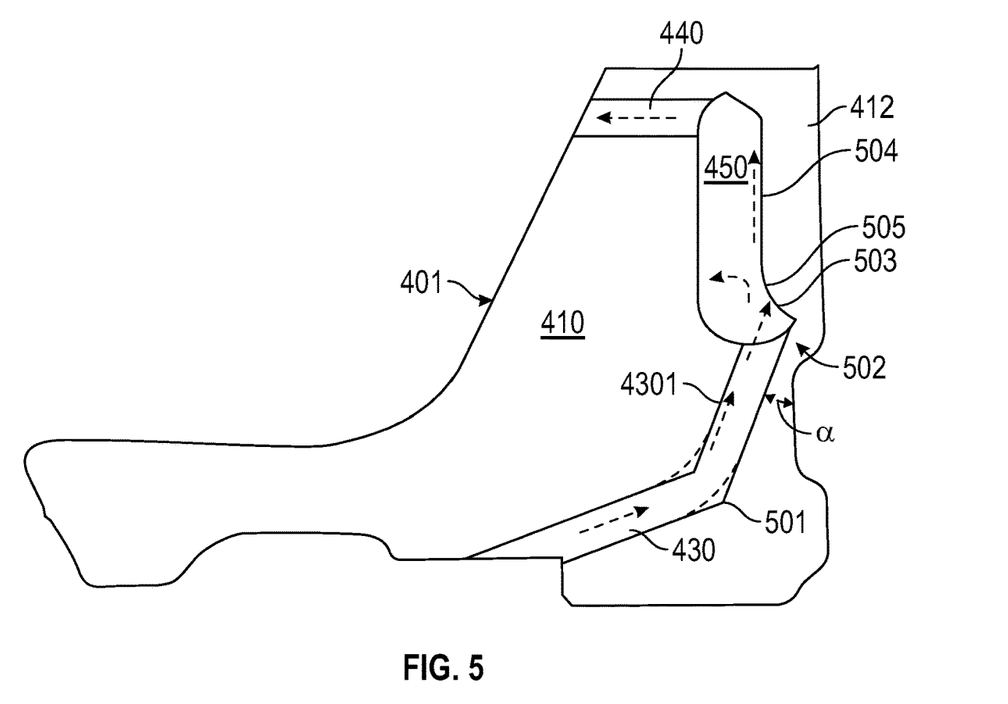
FIG. 5 is schematic side view of a rotating seal with a cooling channel in accordance with further embodiments.

With reference to FIG. 5, alternative and further embodiments of the aft rotating seal 401 are provided.

For example, in accordance with alternative embodiments, the one or more entrance channels 430 can exhibit one or more turns or angles 501 or curves (which are depicted as the dashed lines) between the inlet 431 and the outlet 432. These turns or angles 501 or the curves can be disposed to cause cooling fluid to flow through an increased percentage of an interior of the body 410 or can increase or decrease the angle α at which the cooling fluid impinges against the hot side 451 of the plenum 450. The turns or angles 501 or the curves can be oriented counter-clockwise relative to the initial angling of the one or more entrance channels 430 as shown in FIG. 5 or can be oriented clockwise.

As another example, in accordance with further embodiments, the hot side 451 of the plenum 450 can include a protrusion surface portion 502 that protrudes toward the one or more entrance channels 430 and the relatively cool side 452. The protrusion surface portion 502 includes an impingement section 503 that is disposed to be impinged upon by the cooling fluid exiting the one of more entrance channels 430, a substantially flat section 504 and a curved section 505 that is radially interposed between the impingement section 503 and the substantially flat section 504. The protrusion surface portion 502 increases a turbulence of the flows of cooling fluid within the plenum 450 and thereby increases thermal communication from the second surface 412 to the cooling fluid.

The following description will relate to the embodiments shown in FIG. 4. This is done for purposes of clarity and brevity and it is to be understood that the following description is also applicable to the embodiments of FIG. 5 as well.

Figure 6:
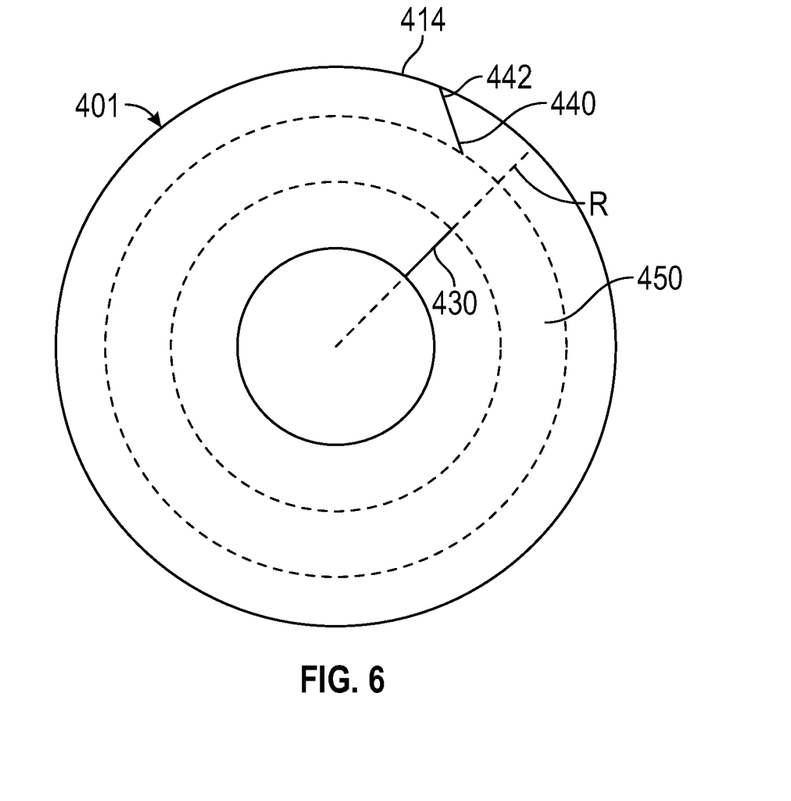
FIG. 6 is an axial view of the rotating seal of FIG. 4 in accordance with embodiments.
Figure 7:
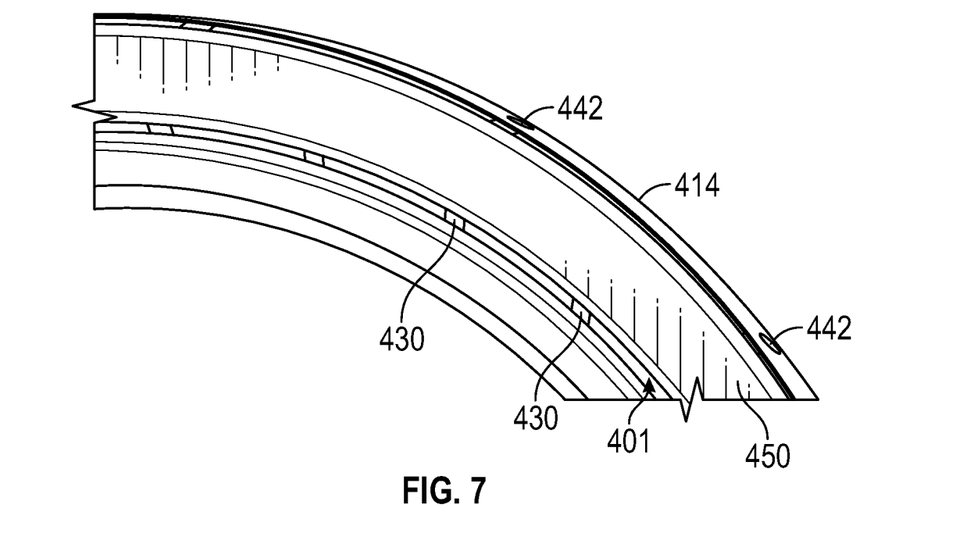
FIG. 7 is a perspective view of the rotating seal of FIG. 4 in accordance with embodiments.
Figure 8:
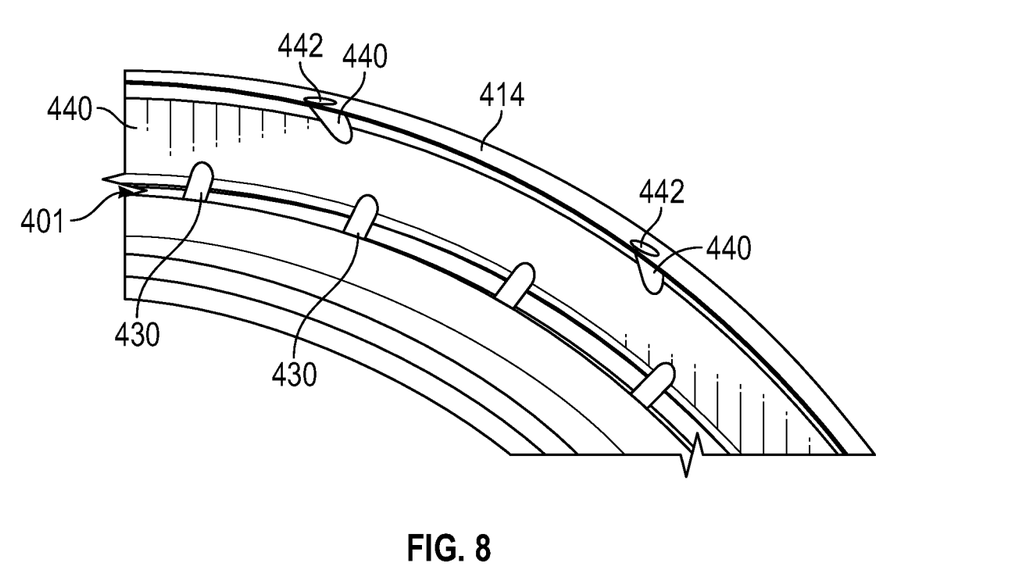
FIG. 8 is a perspective view of the rotating seal of FIG. 4 in accordance with embodiments.

With reference to FIGS. 6-8, the aft rotating seal 401 can be ring-shaped when viewed along the perspective of the rotational axis and the plenum 450 can extend circumferentially through an entirety of the body 410. That is, the plenum 450 can be continuous along the circumferential dimension.

In addition, as shown in FIGS. 6-8, the one or more entrance channels 430 can be oriented along the radial dimension R relative to the rotational axis and the one or more exit channels 440 can be angled relative to the radial dimension R. Regardless of the angling or lack thereof of the one or more entrance channels 230 and the one or more exit channels 440, the outlets 442 of one or more exit channels 440 can be coincident with the first additional surface 413 (see FIG. 4) or the second additional surface 414 (see FIGS. 6-8). In addition, numbers of the one or more entrance channels 430 and the one or more exit channels 440 can be the same or can vary relative to one another by design or application need (only one entrance channel 430 and only one exit channel 440 are shown in FIG. 6 for clarity). In particular, the variation in numbers of entrance channels 430 and exit channels 440 can be provided for optimization purposes, depending on cooling fluid distribution from a design perspective. That is, by having lesser exit channels 440 than entrance channels 430, for example, cooling fluid can be retained within the plenum 450 for longer residence times to allow for more heat removal.

Figure 9:
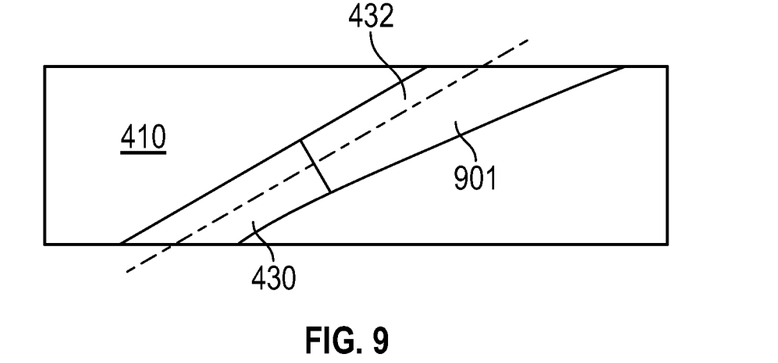
FIG. 9 is a schematic side view of an outlet of an entrance channel of the rotating seal of FIG. 4 in accordance with further embodiments.

With reference to FIG. 9 and in accordance with further embodiments, the outlets 432 of the one or more entrance channels 430 can be formed as flared outlets 901. In such cases, a greater spread of the cooling fluid can impinge on an increased percentage of the hot side 451 of the plenum 450. Here, while an overall velocity of the sprayed cooling fluid can be reduced by the flared outlets 901, the increased coverage of the hot side 451 can result in more uniform cooling. A shape and geometry of the flared outlets 901 can be varied.

Benefits of the features described herein are the provision of an impingement cooling approach that dissipates the heat generated between rotating and stationary seals that contact one another in a gas turbine engine. The impingement cooling provides a relatively high heat removal capability at hot zones as compared to conventional cooling approaches and disperses heat removed from the hot zones to neighboring zones by the formation of cooling oil films exiting the plenum.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotating seal rotatable about a rotational axis and comprising:
    a body having a first surface disposable to face the rotational axis and a second surface disposable to contact with a stationary element,
    the body defining a cooling channel comprising:
        one or more entrance channels respectively extending from the first surface;
        one or more exit channels; and
        a plenum extending circumferentially through the body and having a hot side adjacent to the second surface, the plenum being fluidly interposed between the one or more entrance channels and the one or more exit channels whereby fluid exiting the one or more entrance channels and entering the plenum impinges against the hot side and subsequently exits the plenum by moving away from the hot side and the second surface through the exit channels, wherein the one or more entrance channels are oriented along a radial dimension relative to the rotational axis with angling toward the hot side and the second surface and the one or more exit channels are angled relative to the radial dimension and are directed reversely with respect to a component of the angling of the one or more entrance channels.

2. The rotating seal according to claim 1, wherein the first surface comprises an axial surface disposable to face radially inwardly toward the rotational axis and the second surface is disposable to face axially toward the stationary element.

3. The rotating seal according to claim 1, wherein the one or more entrance channels and the one or more exit channels have circular cross-sections.

4. The rotating seal according to claim 1, wherein the plenum has a racetrack-shaped cross-section and a larger cross-sectional area than the one or more entrance channels and the one or more exit channels.

5. The rotating seal according to claim 1, wherein the plenum comprises a protrusion surface portion that protrudes toward the one or more entrance channels.

6. The rotating seal according to claim 1, wherein the one or more entrance channels have flared outlets.

7. A rotating seal rotatable about a rotational axis and comprising:
  a body having a first surface disposable to face the rotational axis and a second surface disposable to contact with a stationary element,
  the body defining a cooling channel comprising:
    one or more entrance channels respectively extending from the first surface;
    one or more exit channels; and
    a plenum extending circumferentially through the body and having a hot side adjacent to the second surface,
  the plenum being fluidly interposed between the one or more entrance channels and the one or more exit channels whereby fluid exiting the one or more entrance channels and entering the plenum impinges against the hot side and subsequently exits the plenum by moving away from the hot side and the second surface through the exit channels,
  wherein the one or more entrance channels are angled at about ~30-60 degrees from the rotational axis toward the hot side and the second surface.

8. A turbine section of a gas turbine engine having an engine centerline, the turbine section comprising: stationary and rotating seals, which are stationary and rotatable relative to the engine centerline, respectively, the rotating seal comprising:
  a body having a first surface disposable to face the engine centerline and a second surface disposable to contact with the stationary element,
  the body defining a cooling channel comprising:
    one or more entrance channels respectively extending from the first surface;
    one or more exit channels; and
    a plenum extending circumferentially through the body and having a hot side adjacent to the second surface,
  the plenum being fluidly interposed between the one or more entrance channels and the one or more exit channels whereby fluid exiting the one or more entrance channels and entering the plenum flows along outer surfaces of the one or more entrance channels and impinges against the hot side and subsequently exits the plenum by moving away from the hot side and the second surface through the exit channels,
  wherein the one or more entrance channels are oriented along a radial dimension relative to the engine centerline with angling toward the hot side and the second surface and the one or more exit channels are angled relative to the radial dimension and are directed reversely with respect to a component of the angling of the one or more entrance channels.

9. The turbine section according to claim 8, wherein:
the stationary and rotating seals face in the forward and aft directions, respectively, or the stationary and rotating seals face in the aft and forward directions, respectively, and
the first surface comprises an axial surface disposable to face radially inwardly toward the engine centerline and the second surface is disposable to face axially toward the stationary element.

10. The turbine section according to claim 8, wherein the one or more entrance channels and the one or more exit channels have circular cross-sections.

11. The turbine section according to claim 8, wherein the one or more entrance channels are angled at about ~30-60 degrees from the engine centerline toward the hot side and the second surface.

12. The turbine section according to claim 8, wherein the plenum has a racetrack-shaped cross-section and a larger cross-sectional area than the one or more entrance channels and the one or more exit channels.

13. The turbine section according to claim 8, wherein the plenum comprises a protrusion surface portion that protrudes toward the one or more entrance channels.

14. The turbine section according to claim 8, wherein the one or more entrance channels have flared outlets.

* * * * *